United States Patent [19]

Ohkawa

[11] Patent Number: 4,772,897
[45] Date of Patent: Sep. 20, 1988

[54] OPTICAL RECORDING MEDIUM

[75] Inventor: Hideki Ohkawa, Tokyo, Japan

[73] Assignee: Kabushiki Kaisha Toshiba, Japan

[21] Appl. No.: 873,981

[22] Filed: Jun. 13, 1986

[30] Foreign Application Priority Data

Jun. 14, 1985 [JP] Japan .................... 60-129603

[51] Int. Cl.$^4$ .................... G01D 9/00; G03C 1/00
[52] U.S. Cl. .................... 346/135.1; 430/495; 430/945
[58] Field of Search .................... 346/135.1; 430/495, 430/945

[56] References Cited

U.S. PATENT DOCUMENTS 4,335,198  6/1982  Hanada et al. .................... 430/348

FOREIGN PATENT DOCUMENTS 1496029  12/1977  United Kingdom .

Primary Examiner—E. A. Goldberg
Assistant Examiner—Gerald E. Preston
Attorney, Agent, or Firm—Banner, Birch, McKie & Beckett

[57] ABSTRACT

An optical recording medium for optically storing and retrieving information comprises a substrate, two recording layers supported on the substrate and a barrier layer provided between the two recording layers. The two recording layers comprise a thin metallic layer and a thin semiconductor layer which can form an alloy or mixture by applying an energy beam thereto. The barrier layer is employed to prevent the two recording layers from interdiffusing so long as the two recording layers are not exposed to the energy beam.

16 Claims, 2 Drawing Sheets

OPTICAL RECORDING MEDIUM

BACKGROUND OF THE INVENTION

The present invention relates to an optical recording medium capable of storing and retrieving information by light exposure. More specifically, the invention relates to an optical recording disc comprising recording layers that have optical properties which change when the layers are exposed to a focused laser beam.

Optical discs are widely used in industrial and consumer recording systems such as video recorders, digital audio recorders and document digital recorders. A signal is recorded on the optical disc by applying a focused laser beam so that bits of information are formed in the optical disc. The optical disc permits direct read after write and random access to the recorded information.

Optical recording discs have been proposed which comprise a transparent substrate and thin layers of at least two materials supported on the substrate, wherein an energy beam, such as a focused laser beam, is directed to the thin layers to cause structural changes. When the optical disc is irradiated with the energy beam, the materials in the recording layers interchange or are mixed, so that recorded spots are formed in the thin layers due to the localized melting by the energy beam. The mixing of the two layers causes changes in the optical properties of the layers. In a subsequent reading operation, the spots with altered optical properties can be detected as the recorded spots.

An optical disc which discloses the concept of localized melting of the thin layers is reported by K. Y. Ahn in "Laser Writing On Metal-Silicon Bilayers For Optical Storage. I. Optical Properties," J. APPL. PHYS. P. 3777, Vol. 53, May 1982. Another example of an optical disc is disclosed in U.S. Pat. No. 4,477,819. This optical disc is based on the two layer structure as described above, wherein one of the first of the two layers comprises a metal and the other of the two layers comprises a metal or a semiconductor.

A serious disadvantage associated with optical discs with the two layer structure mentioned above is the accidental and unwanted interdiffusion of the two layers. As noted above, the recorded spots are formed when a laser beam causes the two layers to melt and mix thus changing the optical properties in a specific area. The two layers, however, will frequently mix at lower temperatures without exposure to the energy beam. Sunlight, or even room temperature heat can cause some unwanted mixing of the two layers. This mixing will result in a shorter lifetime of the disc and a low signal to noise ratio.

SUMMARY OF THE INVENTION

Accordingly, it is an object of the present invention to provide an improved optical recording medium wherein data can be optically stored and retrieved with a high signal to noise ratio.

It is a further object of the present invention to provide an optical recording medium which has excellent durability and stability.

Another object of the present invention is to provide an optical recording disc with a two layer structure wherein the layers will not interdiffuse unless exposed to a laser beam.

In accordance with the present invention, the foregoing objects, among others, are achieved by providing an optical recording medium comprising a substrate and recording layers of at least two materials supported on the substrate. The recording layers form a recorded area having optical properties different from those of an unrecorded area in accordance with exposure to an energy beam. A barrier layer is also provided between the recording layers. The barrier layer prevents the recording layers from interdiffusing when the recording layers are not exposed to the energy beam.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Figure 1:
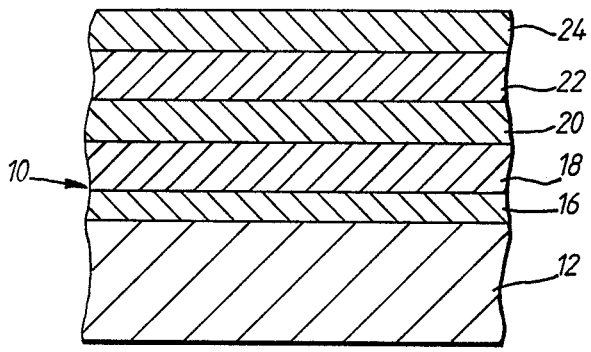
FIG. 1 is a sectional view of an optical disc according to the present invention.

With reference to FIG. 1, an optical disc is generally designated 10. The optical disc may be used as a computer memory medium, an image recording medium for an image information filing system, or other storage medium. The optical disc comprises a transparent substrate 12 in order to allow a laser beam to pass through it. Substrate 12 is formed from a polycarbonate or a PMMA, and takes the form of a disc which can be rotated.

The optical disc has an undercoat layer 16, used to assist in the adhering of a metallic layer 18, and which is deposited on the surface of substrate 12 by plasma polymerization of methane ($CH_4$). This deposition process usually occurs inside a vacuum chamber. The methane gas is introduced into the vacuum chamber and a radio frequency power source is applied so as to generate a plasma of $CH_4$ in the chamber. Under appropriate conditions, various molecular species will be activated by a radio frequency discharge to form a thin film, so that a transparent thin layer is deposited on substrate 12.

First recording layer 18 is formed on the surface of undercoat layer 16. Recording layer 18 comprises a thin metallic layer of a first material selected from the group consisting of Al, Au, Pb, Sn, Te and the like. A preferred thickness for first recording layer 18 lies in the range of about 200 to 400 Angstrom units.

Methods based on vacuum deposition, sputtering and the like may be used to prepare recording layer 18. For example, recording layer 18 can be prepared using an evaporating apparatus. Cleaned substrate 12 with undercoat layer 16 is placed inside a vacuum chamber which is connected to a vacuum pump so that the chamber may be evacuated to a low pressure. Next, barrier layer 20 is deposited on the surface of first recording layer 18. Barrier layer 20 may be prepared by methods based on plasma polymerization, thermal oxidation, anodic oxidation, plasma anodic oxidation or other appropriate methods. For example, to prepare barrier layer 20 by plasma polymerization, substrate 12 having first recording layer 18 formed of Te is first placed inside a chamber containing a gas of CH₄ with a pressure of about 0.1 to 1 Torr. A radio frequency power source is then applied to produce a plasma of CH₄ gas, so that various activated molecular species to be deposited on the disc may be produced. By allowing the disc to stand in this state for a few minutes under appropriate conditions, a polymerized film comprising carbon and hydrogen is deposited on the surface of recording layer 18 as barrier layer 20. This thin layer is transparent so as to allow a laser beam to pass through it.

Thermal oxidation may also be utilized to prepare barrier layer 20 by disposing substrate 12 having a recording layer 18 of Pb in a quartz tube. The infrared ray (IR) may be irradiated to form the thermal oxide on the recording layer of Pb.

Further, anodic oxidation may be used for preparing barrier layer 20. Substrate 12 having a recording layer of Te is immersed in an aqueous solution (pH=8.5) such that recording layer 18 is a predetermined distance from a cathode and connected to a DC power supply. As a result, a thin layer of $TeO_2$ is formed on recording layer 18 as barrier layer 20.

Plasma anodic oxidation may also be utilized to prepare barrier layer 20. Substrate 12 having recording layer 18 is disposed inside a vacuum chamber, wherein the chamber is evacuated to a pressure of about 0.1–1 Torr. Mixtures of $O_2$ and Ar gases are introduced into the chamber and a radio frequency power source is utilized to produce a plasma. During preparation, recording layer 18 is biased by −100 V. After a few minutes in this state an oxidation layer is formed on the surface of recording layer 18.

Second recording layer 22 is formed on the surface of barrier layer 20. Second recording layer 22 comprises a thin semiconductor layer of a second material selected from the group consisting of Ge, Si and the like. A preferred thickness for second recording layer 22 lies in the range of about 200–300 Angstrom units.

Barrier layer 20 prevents interdiffusion between first and second recording layers 18 and 22 except when the two recording layers are exposed to the laser beam. For the purpose of exhibiting this influential effect, a preferred thickness for barrier layer 20 lies in the range of about 10–100 Angstrom units. By utilizing such a thickness, barrier layer 20 works satisfactorily as a barrier for preventing interdiffusion between the two recording layers 18 and 22. A thickness greater than 100 Angstrom units is undesireable because the energy of the laser beam required to record on the optical disc is too high, i.e., higher than the energy produced by available laser diodes. The barrier layer may be an oxide layer formed on the metallic layer 18, which is preferably fabricated by anodic oxidation mentioned above.

The optical disc has a protective layer 24 adjacent to the recording layer 22, which may comprise a transparent thin film formed of an acetyl cellulose. This protective layer 24 is employed to protect the materials of layers 18, 20 and 22 from corrosion due to exposure to environmental factors during the lifetime of the disc.

In accordance with the present invention, a light beam is employed to cause localized heating in the adjoining areas of recording layers 18 and 22 so as to produce a change in the optical properties of the materials included therein. As a result, information is recorded in the disc as a difference of the optical properties between recorded areas and unrecorded areas. This difference may be realized as the recorded spots for the purpose of retrieving information after the recording.

Generally, the materials included in the two recording layers have a complex refractive index expressed as (n=ik), where n represents a refractive index and k represents an extinction coefficient. There is a significant difference between the refractive indexes of a metallic layer and a semiconductor layer as shown in Table 1.

TABLE 1

| Materials | | Refractive Index | Wavelength (nm) |
|---|---|---|---|
| Metal | AL | 1.55 -i 7.00 | 700 |
| | Au | 0.131 -i 3.842 | 700 |
| | Te | 6.1 -i 2.0 | 830 |
| | Ge | 3.2 -i 0.30 | 830 |
| Semiconductor | Si | 3.92 -i 0.05 | 620 |

As shown in Table 1, the refractive index depends on a wavelength of the light applied to the layer, however, there is clearly exhibited a difference in the value of the extinction coefficient between metals and semiconductors. Generally, the extinction coefficient of semiconductors is less than that of metals, so that the light absorption in the semiconductor layer should be less than that in the metal layer. When the multilayer structure, as shown in FIG. 1, is utilized for the optical disc, barrier layer 20 and recording layer 22 should be transparent with respect to the applied laser beam so as to heat recording layer 18.

Figure 2:
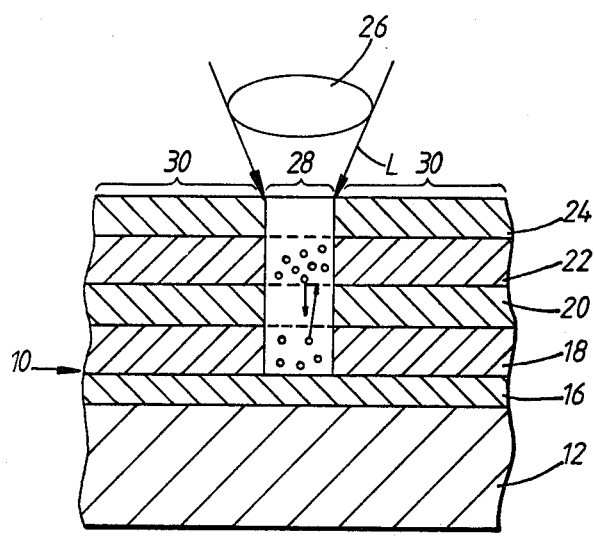
FIG. 2 is a sectional view showing the recorded area of the optical disc according to the present invention.

The light beam, such as a beam L shown in FIG. 2, is focused by means of a lens 26, and directed toward the surface of protective layer 24, or could be directed through transparent substrate 12 to recording layers 18 and 22. The laser beam has a suitable energy level to cause localized melting in recording layers 18 and 22 due to local heating by laser beam L and mixing of the materials across barrier layer 20 as shown by the small arrows in FIG. 2. As disclosed by K. Y. Ahn et al, in their papers mentioned above, a fraction of the two layers 18 and 22 melts at the interface, and interdiffusion is rapidly performed for the formation of alloying or mixing as laser beam L is applied thereto. As a result, a recorded area 28 is formed within an unrecorded area 30. The recorded area 28 provides a reflectivity change from that of an unrecorded area. The energy density of laser beam L depends on the exposure time and the power level of the applied beam. For the lower power levels of the energy beam, there may be formed laser-recorded spots different from the ordinary ablative recording spots.

When the energy beam is applied onto optical disc 10, the applied energy beam is not entirely absorbed in recording layer 22 but is confronted with the surface of recording layer 18. As described above, recording layer 22 comprises a very thin film, so that the applied laser beam is reflected at the surface of the recording layer 18. Once recording layers 18 and 22 are interdiffused by the application of the energy beam, the laser beam will not be reflected at the surface of recording layer 18 as before. Namely, the recorded areas come to have a new complex refractive index different from those of recording layers 18 and 22. Although coherent light is used in the preceding example, incoherent light may be employed so long as the energy density is sufficient to heat the recording layers and effect the interdiffusion.

Figure 3:
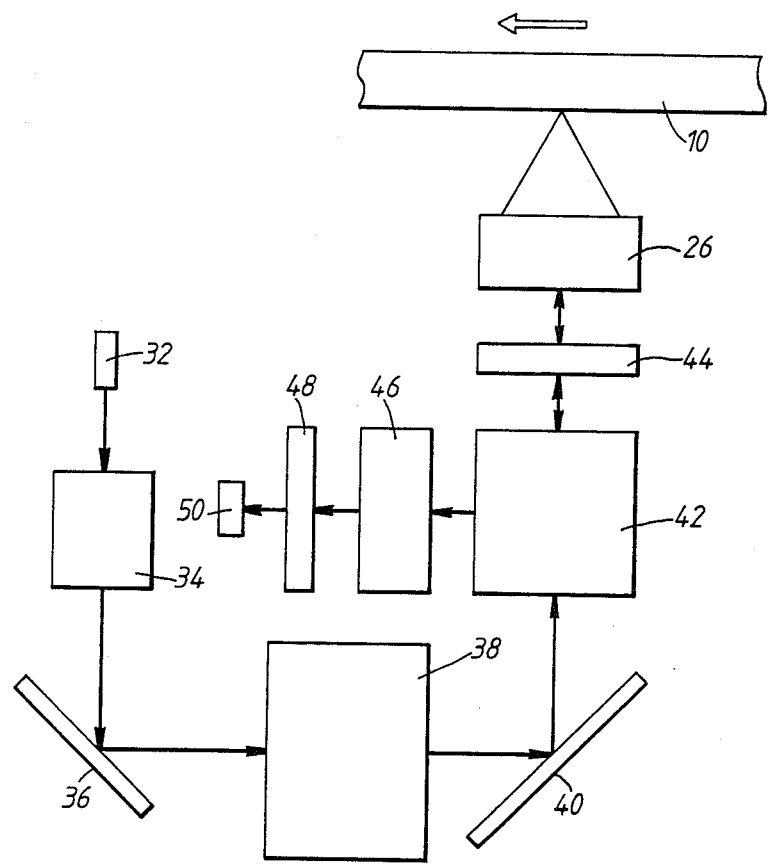
FIG. 3 is a schematic diagram of an optical disc system according to the present invention.

The optical disc described in the foregoing examples is used for an image recording medium for an image information filing apparatus as shown in FIG. 3. The apparatus of FIG. 3 comprises a semiconductor laser diode 32 for reading and recording information. The laser beam emitted from diode 32 is reflected by lens 34 and mirror 36. The light reflected from mirror 36 enters lens 38 parallel to the optical axis and then is reflected by mirror 40. The reflected laser beam from mirror 40 is introduced to beam splitter 42 and then to polarizing plate 44 having a thickness which is about one quarter the wavelength of the applied laser beam. The laser beam enters lens 26 and is thereby focused on optical disc 10. Lens 26 is movably supported by a driving mechanism (not shown) to adjust radially and axially the position of lens 26. Optical disc 10 is rotated at a given velocity as shown by an arrow in FIG. 3.

The light reflected from the disc enters lens 26 again and passes plate 44. At this time, the light is polarized because the light moves by one-half the wavelength of the laser beam, so that the light is deflected to a converging lens 46 and a column lens 48. The reflected light from the optical disc is detected by a detector 50. Lens 26 is moved by the driving mechanism so that the converged spot from lens 26 focuses on the selected groove of the recording disc. Namely, the recording track is traced in response to the output signal of detector 50.

When the optical disc is located on the apparatus shown in FIG. 3 and a reading operation is employed, laser diode 32 continuously emits a laser beam having an intensity below a recording threshold intensity. The intensity of the reflected light changes in response to the optical properties of the recorded areas of the optical disc, where the two recording layers have been interdiffused. The recorded information, therefore, is regenerated as a difference in optical properties. In a recording operation, laser diode 32 emits pulsed light containing information, so that the portion of the recording layers irradiated with the pulsed light is locally melted or mixed.

The present invention will be described further with reference to the following two examples, which illustrate further how an optical disc may be prepared in accordance with the present invention.

EXAMPLE 1

In accordance with the procedure described below, an optical disc of the present invention are prepared.

A transparent substrate comprising a PMMA was provided in the form of a disc having a diameter of about 130 mm and a thickness of about 1.2 mm and carrying grooves thereon of 0.07 um in depth and 0.8 um in width. The substrate was cleaned and placed in a deposition chamber. The substrate was rotated while an appropriate vacuum was maintained inside the deposition chamber. A $CH_4$ gas was introduced into the deposition chamber. In this example, the raw gas in the chamber was adjusted to a pressure level of about 0.1 to 1 Torr and a radio frequency power source was supplied so as to produce an electric discharge. The raw gas was decomposed by a plasma generated in the chamber to provide various activated molecular species to be deposited on the surface of the disc substrate. It is believed that the deposited layer comprises C and H. The deposited transparent film fabricated by plasma polymerization of $CH_4$ mentioned above may work as an undercoat layer. Next, the introduction of the raw gas was interrupted and the radio frequency power was stopped.

A recording layer comprising Al was deposited on the surface of the undercoat layer. The substrate having the undercoat layer thereon was fixed to a supporting member and rotated while an appropriate vacuum was maintained inside the deposition chamber. The material comprising Al was heated to a predetermined temperature, whereby the heated material was evaporated and deposited on the surface of the interface layer. The thickness of the recording layer of Al was adjusted to about 300 Angstrom units.

The substrate having the recording layer formed of Al was disposed in the deposition chamber while a pressure level of about 0.1 to 1 Torr was maintained. While an $O_2$ gas or a mixture of $O_2$ and Ar gases was introduced into the chamber, a radio frequency power source was applied in order to generate a plasma in the chamber. The recording layer was biased by $-100$ V. This state was allowed to stand for 5 minutes so that a barrier layer was fabricated by plasma anodic oxidation. As a result, the barrier layer with a thickness of about 100 Angstrom units were formed on the surface of the metallic recording layer.

A recording layer comprising Ge was then deposited on the surface of the barrier layer. The substrate having the barrier layer was disposed in the deposition chamber wherein an appropriate vacuum was maintained. The material comprising Ge was heated to a predetermined temperature, whereby the heated material was evaporated and deposited on the surface of the barrier layer. The thickness of the recording layer of Ge was adjusted to about 300 Angstrom units.

Further, the recording layer formed of Ge was overcoated with a transparent thin film formed of an acetyl cellulose with a thickness of about 100 Angstrom units.

The resulting optical disc with a multilayered structure, as illustrated in FIG. 1, underwent an interdiffusion upon irradiation with the laser beam having a wavelength of 0.83 um. Namely, a fraction of the two recording layers was mixed at the interface to produce recorded areas when the laser beam was applied to the disc, and strong readout signals were obtainable.

EXAMPLE 2

An optical disc was prepared as described in Example 1, except that Te was used for the first metallic recording layer and a transparent thin film fabricated by plasma polymerization was used for the barrier layer.

Specimens to test an effect of the barrier layer were prepared by varying the thickness thereof. When the thickness was adjusted to less than about 10 Angstrom units, the barrier layer did not work to prevent the interdiffusion. On the other hand, a high energy density laser beam was needed to melt the recording layers when the thickness as adjustd to more than about 100 Angstrom units. For this reason, the thickness of the barrier layer was adjusted to about 100 Angstrom units.

The resulting multilayered optical disc permitted sufficient interdiffusion when exposed to a high energy laser beam to produce recorded areas. A large rate of optical property changes was observed during recording. Furthermore, the archivability or durability of the recording layers were greatly improved due to the use of a barrier layer of the above thickness.

According to the present invention, it is possible to provide an improved optical recording medium that can optically store and retrieve information, has excellent durability and stability, has a high contrast ratio, and can be prepared using a simple film-forming process.

Numerous modifications and variations of the present invention are possible in light of the above teachings. It is therefore to be understood that, within the scope of the appended claims, the present invention can be practiced in a manner other than as specifically described herein.

I claim:

1. An optical recording medium responsive to an energy beam for recording information, said optical recording medium comprising:
   a substrate;
   a first recording layer formed by a first material supported on said substrate;
   a second recording layer formed by a second material different than said first material, said first and second recording layers interdiffusing upon irradiation with the energy beam; and
   barrier layer means, disposed between said first and second recording layers, for preventing said first and second recording layers from interdiffusing except when said first and second recording layers are exposed to the energy beam, the portion of said first and second layers exposed to the energy beam being responsive to the energy beam to form a recorded area having optical properties different than the optical properties of unrecorded areas not exposed to the energy beam.

2. An optical recording medium according to claim 1 wherein the thickness of said barrier layer is greater than or equal to 10 Angstrom units and less than or equal to 100 Angstrom units.

3. An optical recording medium according to claim 1 wherein said barrier layer comprises a film formed by plasma polymerization.

4. An optical recording medium according to claim 1 wherein said barrier layer comprises a layer of oxide formed on the surface of said recording layers.

5. An optical recording medium according to claim 1 wherein said substrate comprises a transparent disc.

6. An optical recording medium according to claim 1 wherein said barrier layer comprises a transparent film.

7. An optical recording medium according to claim 1 wherein at least one of said recording layers is transparent at a wavelength corresponding to that of said energy beam.

8. An optical recording medium according to claim 1 wherein said first recording layer comprises a metallic layer.

9. An optical recording medium according to claim 8 wherein said barrier layer is an oxide of the metal forming said metallic layer.

10. An optical recording medium according to claim 8 wherein said second recording layer comprises a semiconductor layer.

11. An optical recording medium according to claim 8 wherein said first recording layer comprises Te.

12. An optical recording medium according to claim 9 wherein said barrier layer comprises $TeO_2$.

13. An optical recording medium according to claim 1 wherein said first recording layer comprises a semiconductor layer.

14. An optical recording medium according to claim 13 wherein said second recording layer comprises a metallic layer.

15. An optical recording medium according to claim 13 wherein said barrier layer is an oxide of the metal forming said metallic layer.

16. An optical recording medium responsive to an energy beam for recording information, said optical recording medium comprising:
   a substrate;
   a first recording layer formed by a first material supported on said substrate;
   a second recording layer formed by a second material different than said first material, said first and second recording layers undergoing an interdiffusing upon irradiation with the energy beam to form a recording portion without ablation; and
   barrier layer means, disposed between said first and second recording layers, for preventing said first and second recording layers from interdiffusing except when said first and second recording layers are exposed to the energy beam, the recording portion of said first and second layers exposed to the energy beam having optical properties different than the optical properties of unrecorded areas not exposed to the energy beam, the thickness of said barrier layer being in the range of about 10–100 Angstrom units.

* * * * *